US005938991A

United States Patent [19]
Pollock

[11] Patent Number: 5,938,991
[45] Date of Patent: Aug. 17, 1999

[54] PROCESS FOR PLACING COLOR GRAPHICS IN ICE

[75] Inventor: Tom Pollock, Calgary, Canada

[73] Assignee: Big Color Creations Ltd., Calgary, Canada

[21] Appl. No.: 08/878,586

[22] Filed: Jun. 19, 1997

[51] Int. Cl.[6] .......................... A63C 19/10; B29C 39/12; B29C 39/38

[52] U.S. Cl. ................................ 264/28; 264/34; 264/35; 264/132; 264/246; 264/255; 264/273; 264/279.1; 62/235

[58] Field of Search ................................ 264/28, 34, 35, 264/132, 246, 255, 273, 279.1, 298; 62/235

[56] References Cited

U.S. PATENT DOCUMENTS

| | | | |
|---|---|---|---|
| 2,587,855 | 3/1952 | Johnson | 62/235 |
| 2,665,561 | 1/1954 | Yocum . | |
| 3,471,216 | 10/1969 | Lovgren | 350/117 |
| 3,721,418 | 3/1973 | Vincent | 249/1 |
| 3,933,002 | 1/1976 | Vickery | 62/56 |
| 4,667,481 | 5/1987 | Watanabe et al. | 62/235 |
| 4,728,536 | 3/1988 | Burley et al. | 427/154 |
| 5,165,966 | 11/1992 | Adams | 427/256 |

FOREIGN PATENT DOCUMENTS

| | | |
|---|---|---|
| 0 139 948 | 5/1985 | European Pat. Off. . |
| 0 93 354 A1 | 7/1992 | European Pat. Off. . |
| 296 04 773 | 4/1997 | Germany . |
| 60-141237 | 7/1985 | Japan . |

OTHER PUBLICATIONS

Seitz et al., "The "Other" Ice Rink", 794 Revue Technique Sulzer, vol. 77, No. 3, Jan. 1, 1995, pp. 25–27.

*Primary Examiner*—Karen Aftergut
*Attorney, Agent, or Firm*—Thomas E. Malyszko

[57] ABSTRACT

A process for placing a color graphic image in an ice structure requires a substrate of material which is suitable for use in a four-color (CMYK) printing method, which generally retains its shape upon exposure to water or aqueous solution, and which is air permeable. A decal is produced by printing the image on the substrate using the four-color printing method. The decal is placed onto a surface of the ice structure and coated with water which, once frozen, embeds the decal and image thereon within the ice structure. The substrate should become transparent or dissolve after being embedded in the ice structure. The process is suitable for ice hockey rinks, curling rinks, decorative ice sculptures, and the like.

20 Claims, 2 Drawing Sheets

PROCESS FOR PLACING COLOR GRAPHICS IN ICE

FIELD OF THE INVENTION

The present invention relates to placing color images into ice generally, and in particular to placing full color graphic prints into ice structures, such as ice sheets at skating rinks, curling rinks, and the like.

BACKGROUND OF THE INVENTION

Sponsorship advertising is a considerable and important source of revenue for winter leisure industries, such as hockey, curling and other winter sports franchises, and for the sporting centers in which they play. In the case of a hockey arenas, for example, most or all surfaces suitable for displaying advertising are presently exploited for promotional purposes to generate advertising revenue. Recently, even the arenas' ice sheets have been made available for this purpose.

Advertisements or other markings (e.g. the "blue" and "red" off-side lines) within such ice sheets have been brushed or sprayed directly into the ice using known paints. More ice is then placed over the painted images to protect them. The resultant images are fairly crude because they are either produced free-hand or with the aid of a stencil, and subtle color gradations are not possible. These prior art processes are also labor intensive and time consuming, and so the images can be expensive to produce.

Since such crude images have limited appeal, the fill revenue potential of ice space has not been fully exploited. Therefore, arena operators and advertising sponsors have sought but failed to improve image quality and resultant advertising revenues. Attempts have been made to place sheets of paper or other impermeable materials with better color graphics into ice sheets, with poor or unacceptable results. First, the graphics are not produced using a four color process, and therefore are of relatively poor quality. Rather, a solid color printing method is used without color gradation or sophisticated graphic capabilities, for instance. Second, the sheets either distort or deteriorate into smaller pieces (e.g. like bathroom tissue paper in water). Others tend to trap air and float as water is applied over the sheet. Hence, quite thick top layers of ice must be provided to adequately protect the sheets and prevent cracking or buckling of the ice above the sheet. As a result, such sheets require considerable effort and time to place and remove from the ice sheet.

What is therefore desired is a process of producing and placing full color graphic images within ice sheets which overcomes the limitations and disadvantages of prior ice graphic methods. The invention should provide an easy, relatively quick and cost effective means of creating high quality graphic images on a carrier medium and of placing such images within an ice structure. In particular, the high quality graphic images should be produced on the carrier medium using a four-color (a.k.a. CMYK) printing method. Such graphics, including the carrier medium, should also be capable of relatively easy and quick removal from the ice sheet (for disposal).

SUMMARY OF THE PRESENT INVENTION

In a first aspect the invention provides a process for placing a graphic image in an ice structure comprising the steps of:

providing a substrate of material which is suitable for use in a four-color printing method, generally retains its shape upon exposure to moisture, and is air permeable;

producing a printed substrate by printing said image on said substrate using a four-color printing method;

placing said printed substrate onto a surface of said ice structure;

coating said printed substrate with a liquid; and, freezing said liquid to embed said printed substrate within said ice structure.

In a second aspect the invention provides a decal for use in an ice structure comprising:

a substrate which: is suitable for use in a four-color printing method; substantially retains its shape upon exposure to moisture and freezing; and, is air permeable; and, an image printed on said substrate using said four color printing method.

In a third aspect the invention provides an ice structure comprising:

a first layer of ice;

a decal placed onto said first layer, said decal comprising an image on a substrate which is suitable for use in a four-color printing method, which substantially retains its shape upon exposure to moisture and freezing, and which is air permeable; and, a liquid for coating said decal, wherein said liquid is frozen after said coating to produce a second layer of ice for embedding said decal in said ice structure.

BRIEF DESCRIPTION OF THE DRAWING FIGURES

Embodiments of the invention will now be described, by way of example only, with reference to the accompanying drawings, wherein.

DESCRIPTION OF PREFERRED EMBODIMENT

Figure 1:
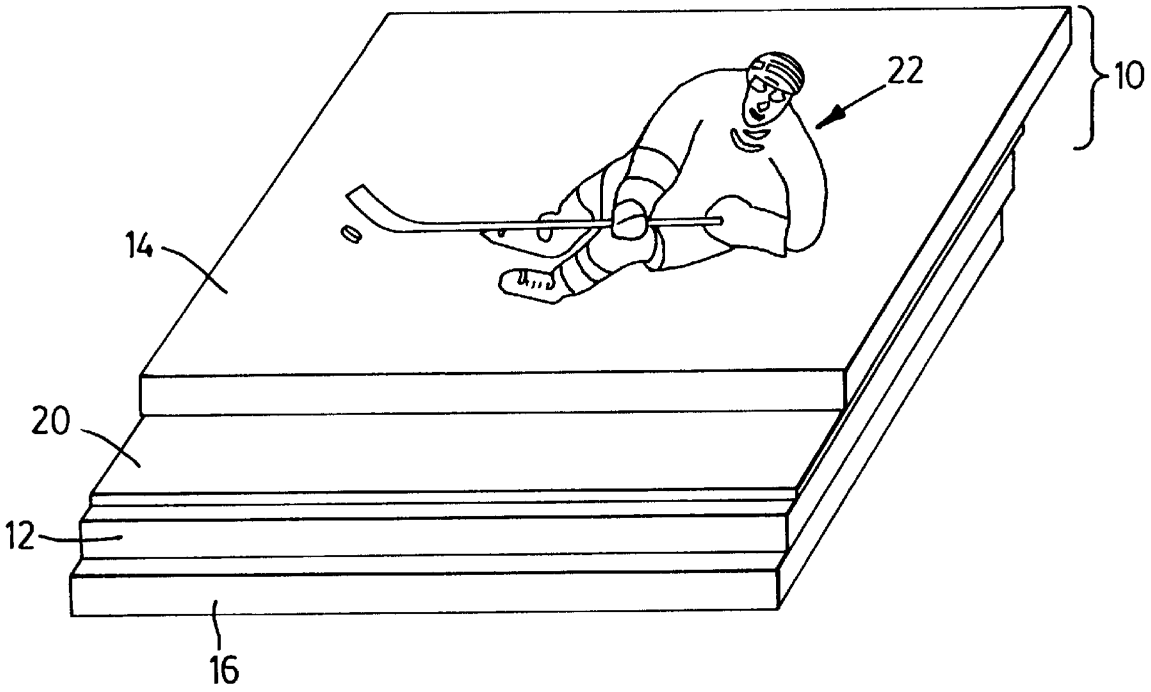
FIG. 1 is a perspective cross-section view, partially broken away, of an ice sheet with an imbedded printed image.
Figure 2:
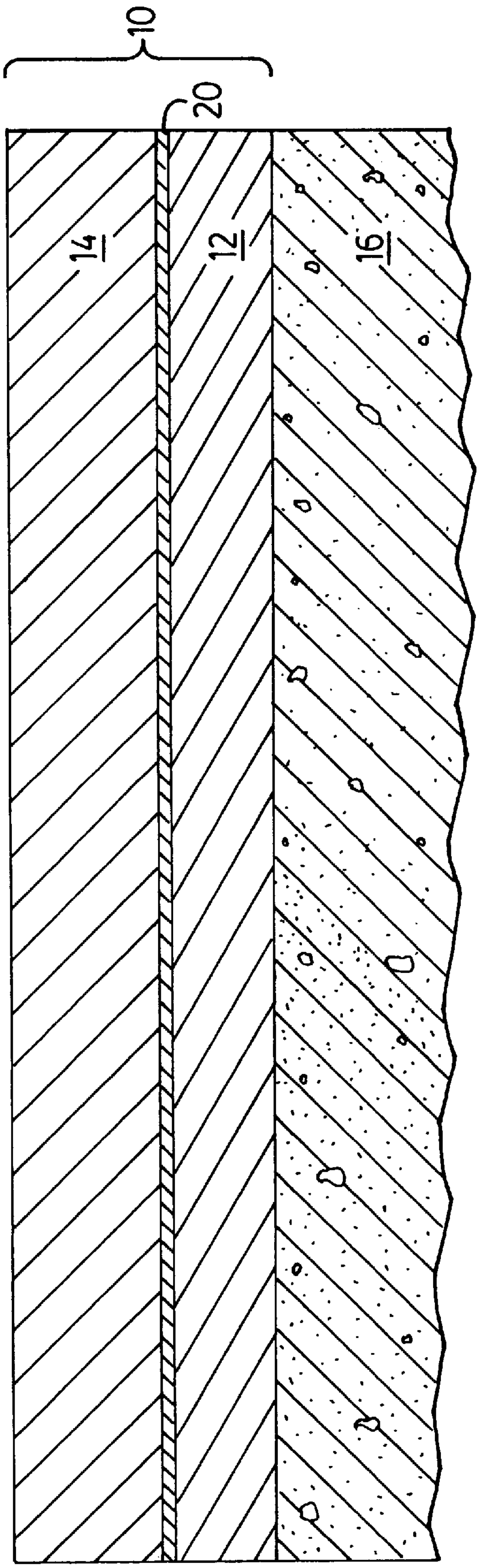
FIG. 2 is a cross-sectional view of the ice sheet of FIG. 1.

Reference is first made to FIG. 1 which shows an installation of a full color graphic image 22 of a hockey player in an ice sheet (generally indicated by reference numeral 10) according to the process of the present invention. Referring to FIG. 2 as well, there are certain aspects of the ice sheet 10 shown which are typical of many indoor ice applications at present, namely a whitened layer of ice 12, usually about 0.5–0.75 inches (about 12 to 20 mm) thick, installed on a ground surface or base 16 of concrete or sand. The ice above the base 16 is kept frozen by a cooling system (not shown) which circulates a refrigerant through a network of pipes embedded in the base. It will be understood that "ice" herein refers to water or any other suitable aqueous solution which is frozen.

Previous methods of marking ice involved applying paint over the whitened ice layer 12 to form an image or text prior to placing a clear top layer of ice 14. It is understood that the top layer 14 is usually about 0.5–0.75 inches thick and is typically created in several stages, namely by repeatedly "flooding" or placing water over the whitened ice layer 12. These thinner ice layers may be applied with an ice cleaning vehicle commonly referred to as a "Zamboni". For "retrofit" installations where it is desired to place a new image into an existing ice sheet 10, or to remove/replace an existing image in the ice sheet 10, a localized area of the top ice layer 14 is first removed by scraping the ice away with a Zamboni or other equipment, or perhaps by melting the requisite area of the ice layer 14, sufficiently to remove the paint of the existing image as well. The new image is then painted and the top ice layer 14 is replaced as described above.

Figure 3:
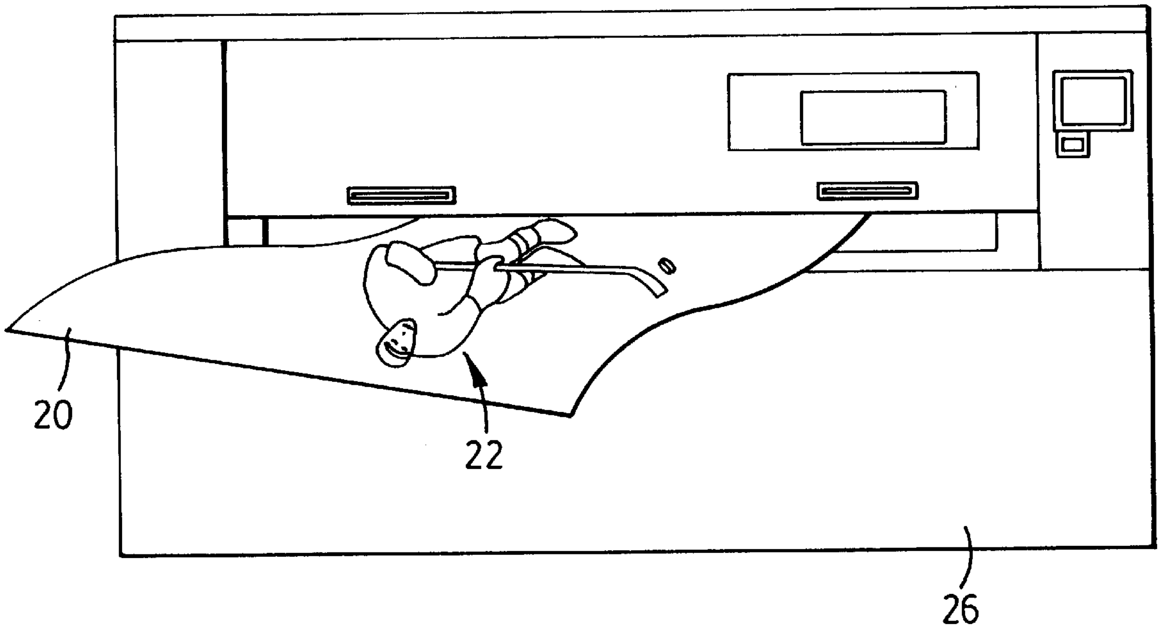
FIG. 3 shows the image of FIG. 1 being produced on a carrier medium by a four color printer.

In the process of the present invention, a whitened layer of ice 12 will typically also be installed in preparation for receiving a substrate or carrier medium, namely one or more sheets of carrier material 20 which form the image 22. In the preferred embodiment shown in the figures only one sheet 20 is required for the image 22. The image 22 is printed on the sheet 20 using a four-color printer 26 (see FIG. 3), discussed in greater detail below, to form a decal. The printed sheet 20 is next placed or mounted over the white ice layer 12 in a desired location. The sheet 20 need not be attached to its ice foundation with any adhesive or the like if attention is paid not to disturb the sheet when flooding the ice surface 10 with water or other suitable liquid to place or replace the clear top ice layer 14 atop the print. However, optionally, the white ice layer 12 may be wetted with some water just before placing the sheet 20 on top to provide some adhesion between the sheet and ice underneath prior to flooding water onto the sheet. Such wetting should also fill any voids left in the white ice layer 12 by the scrapping of the Zamboni. Once the print 20 is covered by a first thin layer of ice, the remaining portion of the top layer 14 may be installed without risk of disturbing the sheet below. It will be understood that a purpose of having the white ice layer 12 is to hide the base 16 from view and to provide a suitable background for images above the layer 12. Hence, the sheet 20 need not be placed directly on the white ice layer 12 as shown in the figures, but merely above the white layer 12 anywhere in the clear layer 14. Should the white layer 12 be omitted, the sheet may be placed directly on the base 16, or in any other ice layer for that matter.

Referring again to FIG. 3, the image 22 is shown emerging from the four-color printer 26 on the sheet 20. The printer 26 uses a well known four-color printing method which combines the four colors of <u>c</u>yan, <u>m</u>agenta, <u>y</u>ellow and blac<u>k</u> (hence termed the “CMYK” printing process) to create a myriad of colors, shades and gradations not attainable by hand painting. This printing method is currently used to transfer sophisticated color graphics or photos onto posters, banners, murals, billboards, etc. Preferably a special large-format commercial version of the four-color printer should be used to generate prints 20 for use at ice rinks to reduce the number of sheets required to form the image 22, for example one that may use sheets up to 56 inches in width, and of any length. Regarding use of inks, good results have been achieved with standard water insoluble inks.

The type of carrier material used is also important to this invention in that it allows use of a four-color printing method to place images in ice. The carrier material should therefore possess certain qualities. First, it must be compatible with the four-color printing process, such as being of an acceptable size (including thickness, say between 0.002 and 0.010 inches) for the printer 26, and capable of receiving and retaining inks used in the printing process (i.e. smooth and stiff enough to accept the ink). Second, the carrier material should retain its shape upon exposure to water or moisture. Hence, it should be amenable to getting wet without any undue affects such as shrinkage, wrinkling, or warping, so as not to distort the printed image. Third, the carrier should be porous enough for letting air through the sheet to avoid trapping air bubbles or forming air pockets during installation in the ice sheet 10, yet it should be dense enough to avoid floating when submersed in water. This quality allows the printed sheet 20 to be covered with a relatively thinner layer of ice in comparison with prior sheets as noted earlier. Fourth, upon wetting, it is desireable that the carrier material should become nearly or completely transparent, so that one sees only the printed image 22 through the top ice layer 14. Hence, the sheet does not detract the viewer’s attention from the image itself. Good results have been achieved in the present invention using a material or fabric of a high quality white polyester weave or textile such as is currently used to manufacture fabric softener sheets for use in residential clothes dryers. Optionally, the carrier material may be of the type which eventually dissolves in the ice sheet, thus leaving the printed image in the ice without any visible substrate for removal. Further, it may also be of the type which is durable and tear resistant, and thus suitable for repeated removal and re-use if the top ice layer is melted rather than scraped up by a Zamboni.

It should now be apparent that the present invention provides a convenient and cost effective process to place or replace appealing full color graphics in ice. It also provides other options not possible prior to the invention, such as replacing currently painted-on lines and symbols used for hockey and curling, for example, into much more effective and attractive markers. For instance, a fading border in the ice sheet adjacent the perimeter boards of an ice hockey rink could be used as a safety measure to warn an inattentive player with his head down that he is approaching the boards, and so should watch out.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below. For example, the carrier material itself may vary somewhat in composition or dimension and still be suitable for this invention. The printing process may also vary somewhat in ink or technology, for example using laser instead of ink-jet, and still produce acceptable results. The invention is further not limited to indoor ice rinks, but has many other applications, such as in outdoor rinks, decorative ice sculptures, etc., and, additionally, is suitable for images printed in shades of black and white.

I claim:

1. A process for placing a graphic image in an ice structure comprising the steps of:

providing a substrate of material which is suitable for use in a four-color printing method, generally retains its shape upon exposure to moisture, and is air permeable;

producing a printed substrate by printing said image on said substrate using said four-color printing method;

placing said printed substrate onto a surface of said ice structure;

coating said printed substrate with a liquid; and, freezing said liquid to embed said printed substrate within said ice structure.

2. The process of claim 1 wherein said substrate becomes substantially transparent after contact with said liquid.

3. The process of claim 1 wherein said substrate remains durable and tear resistant after said freezing of said liquid for further re-use upon subsequent melting of said frozen liquid.

4. The process of claim 1 further comprising using a substantially insoluble ink in said four-color printing method.

5. The process of claim 1 wherein said printing comprises passing said substrate through a four-color printer to transfer said image to said substrate using a substantially insoluble ink.

6. The process of claim 1 further comprising wetting said surface of said ice structure prior to placing said printed substrate thereon.

7. The process of claim 1 further comprising locating said ice structure over a generally horizontal base, said ice structure having a first layer of ice adjacent said base, wherein said printed substrate is placed onto said first layer, and said frozen liquid over said printed substrate forms a second layer of ice.

8. The process of claim 7 wherein said first layer of ice is generally opaque and said second layer of ice is generally transparent for viewing said image.

9. The process of claim 2 wherein said substrate remains durable and tear resistant after said freezing of said liquid for further re-use upon subsequent melting of said frozen liquid.

10. The process of claim 2 further comprising using a substantially insoluble ink in said four-color printing method.

11. The process of claim 2 further comprising wetting said surface of said ice structure prior to placing said printed substrate thereon.

12. The process of claim 2 further comprising locating said ice structure over a generally horizontal base, said ice structure having a first layer of ice adjacent said base, wherein said printed substrate is placed onto said first layer, and said frozen liquid over said printed substrate forms a second layer of ice.

13. The process of claim 3 wherein said printing comprises passing said substrate through a four-color printer to transfer said image to said substrate using a substantially insoluble ink.

14. The process of claim 3 further comprising wetting said surface of said ice structure prior to placing said printed substrate thereon.

15. The process of claim 3 further comprising locating said ice structure over a generally horizontal base, said ice structure having a first layer of ice adjacent said base, wherein said printed substrate is placed onto said first layer, and said frozen liquid over said printed substrate forms a second layer of ice.

16. The process of claim 4 further comprising wetting said surface of said ice structure prior to placing said printed substrate thereon.

17. The process of claim 5 further comprising locating said ice structure over a generally horizontal base, said ice structure having a first layer of ice adjacent said base, wherein said printed substrate is placed onto said first layer, and said frozen liquid over said printed substrate forms a second layer of ice.

18. The process of claim 6 further comprising locating said ice structure over a generally horizontal base, said ice structure having a first layer of ice adjacent said base, wherein said printed substrate is placed onto said first layer, and said frozen liquid over said printed substrate forms a second layer of ice.

19. The process of claim 1 further comprising:

(a) using a substantially insoluble ink in said four-color printing method;

(b) wetting said surface of said ice structure prior to placing said printed substrate thereon; and, (c) locating said ice structure over a generally horizontal base, said ice structure having a first layer of ice adjacent said base, wherein said printed substrate is placed onto said first layer, and said frozen liquid over said printed substrate forms a second layer of ice.

20. The process of claim 19 wherein said substrate becomes substantially transparent after contact with said liquid and remains durable and tear resistant after said freezing of said liquid for further re-use upon subsequent melting of said frozen liquid.

* * * * *